(12) United States Patent
Nuyan et al.

(10) Patent No.: US 9,254,770 B2
(45) Date of Patent: Feb. 9, 2016

(54) METHOD FOR PRODUCING A REAR WALL OF A SEAT BACKREST

(75) Inventors: Vedat Nuyan, Wuppertal (DE); Jörg Jonas, Wülfrath (DE); Axel Koever, Köln (DE); Leonid Fissler, Leverkusen (DE); Matthias Goebel, Köln (DE); Marian Stepankowsky, Stuttgart (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 360 days.

(21) Appl. No.: 13/497,466

(22) PCT Filed: Sep. 22, 2010

(86) PCT No.: PCT/EP2010/063994
§ 371 (c)(1),
(2), (4) Date: May 29, 2012

(87) PCT Pub. No.: WO2011/036185
PCT Pub. Date: Mar. 31, 2011

(65) Prior Publication Data
US 2012/0234455 A1  Sep. 20, 2012

(30) Foreign Application Priority Data
Sep. 22, 2009  (DE) .......................... 10 2009 042 261

(51) Int. Cl.
*B60N 2/68* (2006.01)
*B29C 65/02* (2006.01)

(52) U.S. Cl.
CPC ................ *B60N 2/686* (2013.01); *B29C 65/02* (2013.01); *B60N 2/682* (2013.01); *B60N 2205/30* (2013.01); *Y10S 297/02* (2013.01); *Y10T 156/10* (2015.01)

(58) Field of Classification Search
CPC ........ Y10S 297/02; B60N 2/68; B60N 2/682; B60N 2/684; B60N 2205/30; B32B 37/04; B29C 65/02
USPC .................................. 156/309.6; 297/452.18
See application file for complete search history.

(56) References Cited

U.S. PATENT DOCUMENTS 3,669,495 A * 6/1972 Von Rudgisch .......... 297/451.11
3,832,433 A * 8/1974 Schaffer et al. ................ 264/143
(Continued)

FOREIGN PATENT DOCUMENTS

DE  197 57 060 A1  6/1999
DE  100 22 984 A1  11/2001
(Continued)

OTHER PUBLICATIONS

Machine Translation for Kelling et al. DE10161082.*
(Continued)

*Primary Examiner* — Scott W Dodds
(74) *Attorney, Agent, or Firm* — Foley & Lardner LLP

(57) ABSTRACT

A method is described for manufacturing a vehicle seat structure, a vehicle seat or a vehicle seat bench. A frame structure and reinforcement ribs and absorption ribs are formed on at least one back shell, whereby structural insertion components are arranged in or on the back shell and/or the frame structure.

16 Claims, 5 Drawing Sheets

(56) References Cited

U.S. PATENT DOCUMENTS

Figure 1:
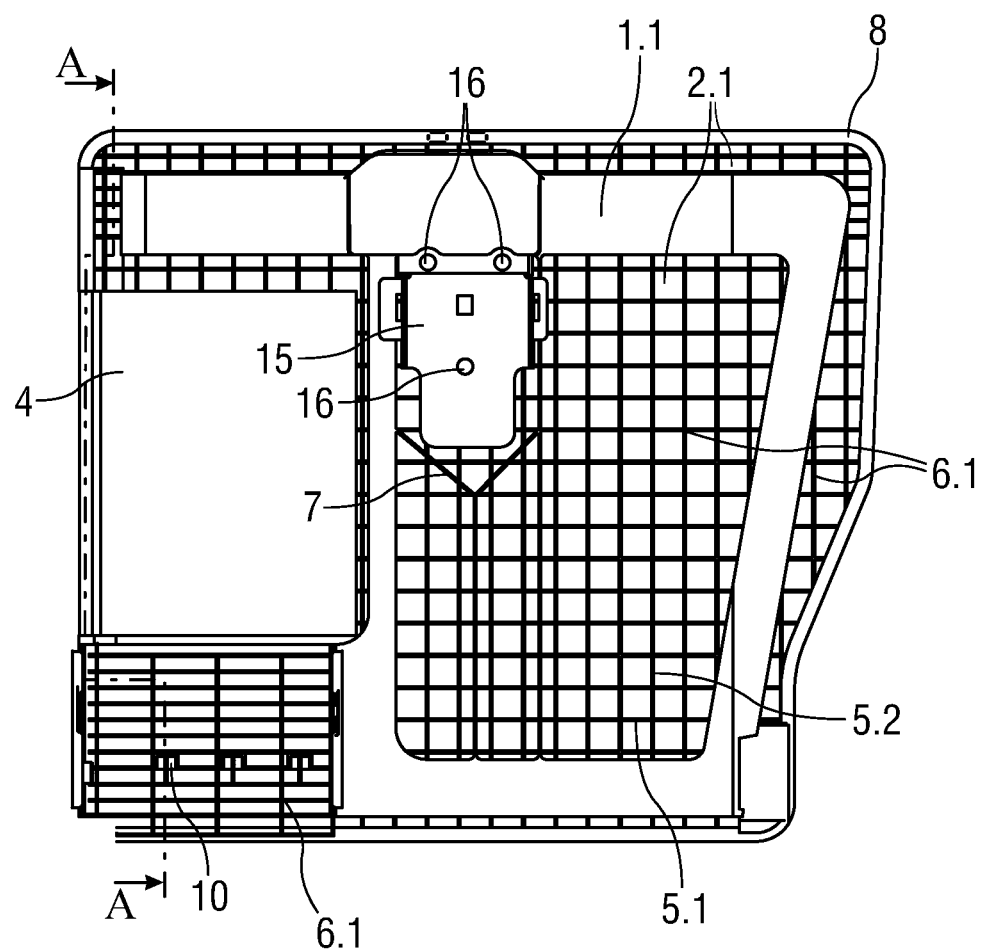

| | | | | |
|---|---|---|---|---|
| 4,189,180 | A | * | 2/1980 | Klein ................ 297/452.45 |
| 5,487,591 | A | * | 1/1996 | Knoblock ............ 297/452.14 |
| 2005/0023880 | A1 | | 2/2005 | Fourrey et al. |
| 2008/0038569 | A1 | | 2/2008 | Evans et al. |

FOREIGN PATENT DOCUMENTS

| DE | 101 61 082 A1 | 7/2003 |
|---|---|---|
| DE | 103 21 277 A1 | 12/2004 |
| DE | 102006012 69 9 A1 | 9/2007 |
| DE | 1020060 51 566 A1 | 5/2008 |
| EP | 1 880 897 A2 | 1/2008 |
| FR | 2534792 A1 | 4/1984 |
| JP | 10-194016 A | 7/1998 |
| WO | WO-2004/024424 A1 | 3/2004 |

OTHER PUBLICATIONS

Notice of Reasons for Rejection dated Aug. 27, 2013, as received in corresponding Japanese Patent Application No. 2012-530252, and English language translation of the same.

First Office Action dated Jul. 3, 2013, as received in corresponding Chinese Patent Application No. 201080041827.7, and English language translation of the same.

International Search Report dated Jan. 7, 2011 as received in corresponding PCT Application No. PCT/EP2010/063994, 7 pages.

Third Office Action dated May 5, 2014 issued in corresponding Chinese Patent Application No. 201080041827.7.

* cited by examiner

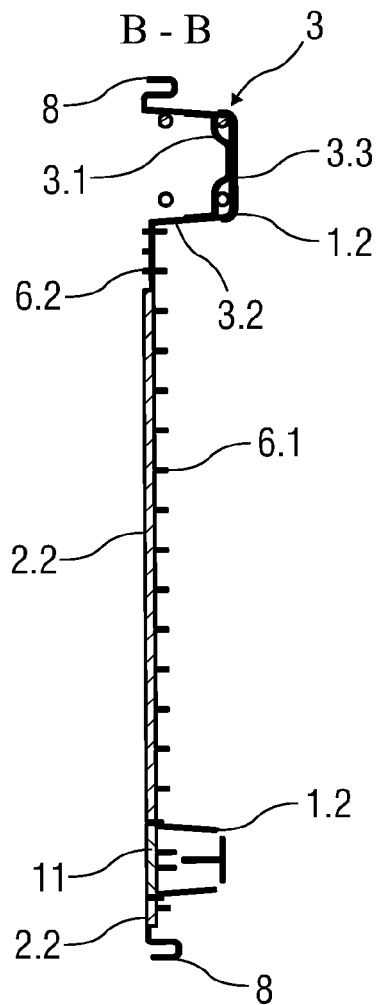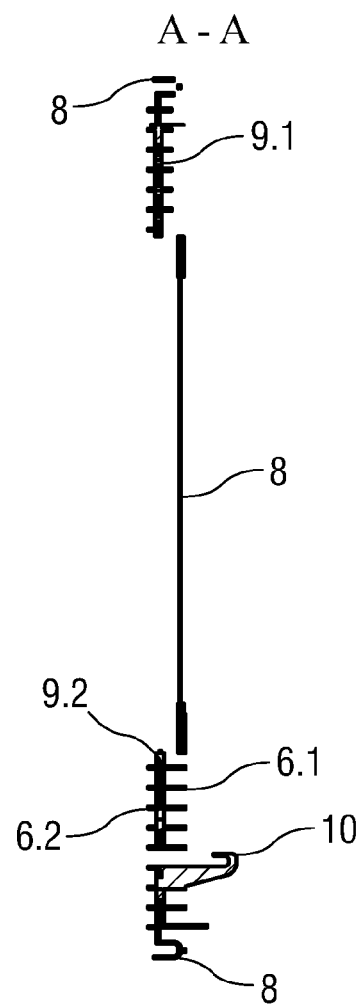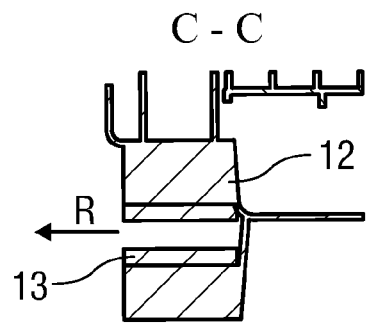

METHOD FOR PRODUCING A REAR WALL OF A SEAT BACKREST

CROSS REFERENCE TO RELATED APPLICATIONS

The present application is a National Stage of International Application No. PCT/EP2010/063994 filed on Sep. 22, 2010, which claims the benefit of German Patent Application No. 10 2009 042 261.7 filed on Sep. 22, 2009, the entire disclosures of which are incorporated herein by reference.

The invention relates to a method of manufacturing a vehicle seat structure, a vehicle seat or a vehicle seat bench.

Vehicle seat structures of the generic type are known from the prior art. They frequently have a carrier structure of metal. Flat structural components are fasted to this structure that usually also consist of metal, whereby a welding process, especially preferably a laser welding process is used with preference as connecting technique. Furthermore, the use of a vehicle seat structure used as a back seat rest in a design divided, for example, ⅔ to ⅓ is known for achieving a greater variability in the utilization of the loading space.

DE 10 2006 012 699 A1 relates to a three-dimensional structure in the interior of a motor vehicle whereby it has an area consisting of a plastic reinforced with non-directed longitudinal fibers and an area consisting of a plastic reinforced with multi-dimensionally directed fibers.

DE 10 2006 051 566 A1 relates to a backrest with a frame structure consisting of a deformable plastic material, especially a thermoplastic or duroplastic plastic material that can be manufactured in a plastic deformation process. During this manufacture at least one receiving part can be formed in or on the frame structure and/or at least one prefabricated insertion part can be integrated, whereby the at least one receiving part serves to receive at least one additional structural component in or on the frame structure and/or for binding to the carcass surrounding the backrest while the at least one insertion part prevents the penetration of an object arranged on a back side of the backrest.

DE 103 21 277 A1 discloses a backrest consisting of at least one padding that is attached to a frame consisting of a plastic and that is braced with at least one carrier constructed in one piece with the frame. The frame and the at least one carrier are covered with a plastic foam that forms a rest shell.

DE 197 57 060 A1 describes a backrest for a vehicle seat in which the carrier structure is constructed from a rear half shell forming a back wall of the backrest and from a front half shell in such a manner that the half shelves are connected to one another with the formation of a hollow profile and that the hollow profile is formed at least on opposite side edges and on an upper front side of the backrest which upper side connects the two side edges.

DE 101 61 082 A1 relates to a backrest for a vehicle seat with side struts, and upper frame part connecting the side struts at their upper ends, a transverse bracing running in the transverse direction and attached between the lateral struts in a lower area, and with a backrest covering attached to the struts and to the upper frame part. In order to create a backrest with low weight that has great rigidity, is safe in crashes and can be readily mounted and dismounted, it is suggested that the transverse bracing is constructed as part of the backrest covering.

US 2008/0038569 A1 describes a backrest for a vehicle seat that consists of fiber-reinforced plastic.

The present invention has the task of making a method available for the manufacture of a vehicle seat structure, a vehicle seat or a vehicle seat bench that are optimized with respect to weight and manufacture and meet the demands of rigidity and strength as well as energy absorption and at the same time can be optimized to make use of the loading area.

As regards the method, the task is solved by the features described further herein. Advantageous further developments of the invention are also described further herein.

In the method for the manufacture of a vehicle seat structure, a vehicle seat or a vehicle seat bench, a frame structure and reinforcement ribs as well as absorption ribs are formed in accordance with the invention on at least one back shell, whereby structural insertion components are arranged in or on the back shell and/or the frame structure. Vehicle seat structures manufactured by the method are advantageously reduced in weight and are especially bend-resistant and safe in crashes.

The back shell and the frame structure are preferably formed from the same thermoplastic, fiber-reinforced plastic. This advantageously makes possible a one-piece connection of the back shell and the frame structure.

The back shell and the frame structure are connected to one another plastic to plastic especially preferably by melting the surfaces and subsequently joining them together to form an integrated structural component. Such a plastic to plastic connection makes possible especially high rates of force transfer.

The frame structure is preferably formed running around the back shell. This makes possible an especially high resistance to bending of the vehicle seat structure.

The structural insertion components are especially preferably encased at least in areas by the thermoplastic plastic of the back shell. In this manner a positive and stable connection is made possible in a simple manner between the back shell and/or the frame structure and a structural insertion component.

The structural insertion components are preferably manufactured from a metallic material or from a semi-product consisting of a fiber composite. The material of the structural insertion component advantageously has a greater strength than the thermoplastic plastic of the back shell and/or of the frame structure. As a consequence, the vehicle seat structure can be reinforced or stiffened at least in areas by the structural insertion components.

An area of the loading opening is preferably structured during the manufacturing process of the vehicle seat structure. This makes possible an optically attractive area of the loading opening that is pleasant to grasp.

The structural insertion components are preferably formed as a structural support component and, in a corresponding manner, as a formed structural covering component and integrated into the frame structure. This significantly improves the resistance to torsion and/or bending of the vehicle seat structure.

In an advantageous embodiment the structural insertion components are formed as a belt connection structural component. Such an integration of the belt connection structural components into the vehicle seat structure saves the arrangement of additional structural components on the vehicle seat structure and thus reduces the number of structural components and the complexity of the vehicle.

In an advantageous embodiment the structural insertion components are formed as a trim conduit. Seat coverings can be fastened on such a trim conduit in a simple and time-saving manner.

In an alternative embodiment the structural insertion components are formed as armrest receivers. This makes possible a supporting of the armrests directly in the vehicle seat structure and a resulting direct introduction of force of the forces acting on the armrests into the vehicle seat structure. The introduction of structural insertion components into the vehicle seat structure makes possible a bracing of the entire the armrest receiver area or of the force introduction points. In an especially advantageous embodiment the structural insertion component is formed as a casing in which a rotary shaft of the armrest can be arranged.

In another, alternative embodiment the structural insertion components are formed as rest pivot bearing areas. All the forces acting on the vehicle seat structure during the operation of the vehicle are introduced into a vehicle body by the rest pivot bearing area. Thus, the rest pivot bearing area is the heaviest-loaded area of the vehicle seat structure, which area is significantly reinforced by the arrangement of a structural insertion component in accordance with the invention.

Preferably at least one trim hook is formed on a front side of the back shell. A seat covering can advantageously be fastened on it.

Preferably one bush is pressed into the vehicle seat structure that receives, for example, a rotary shaft of an armrest.

Further structural components are arranged on the vehicle seat structure especially preferably with traditional connection means, for example, screws.

The invention is explained in detail using the attached schematic figures.

Figure 2:
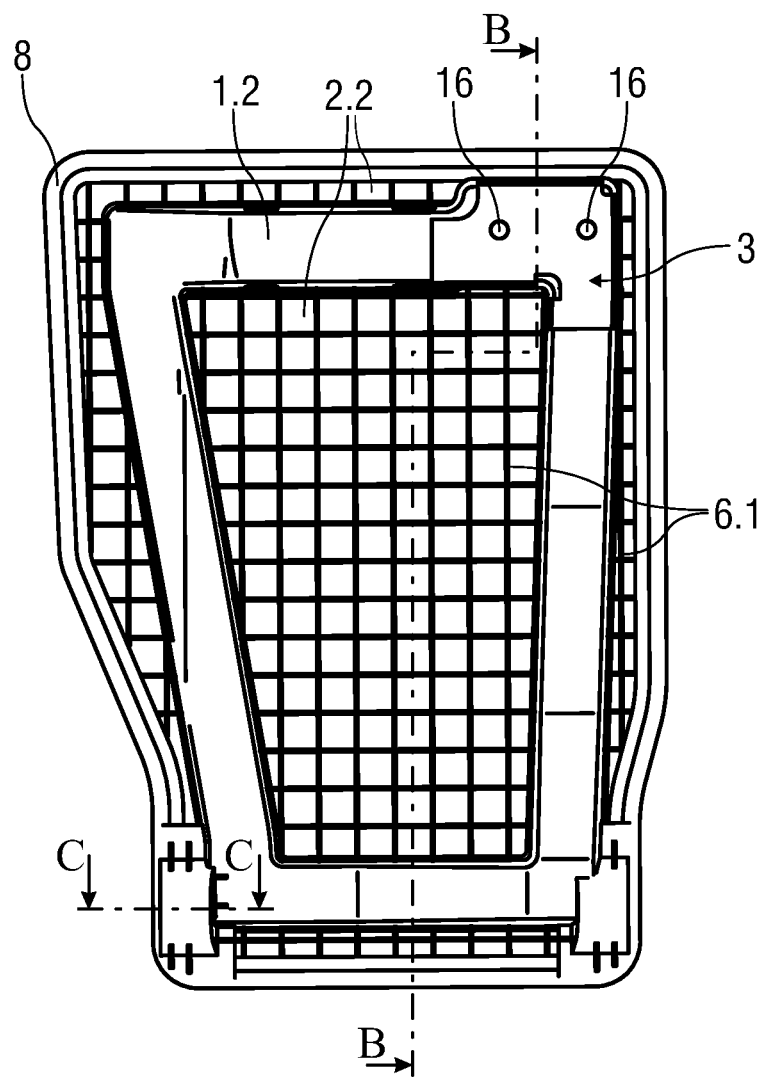
Figure 6:
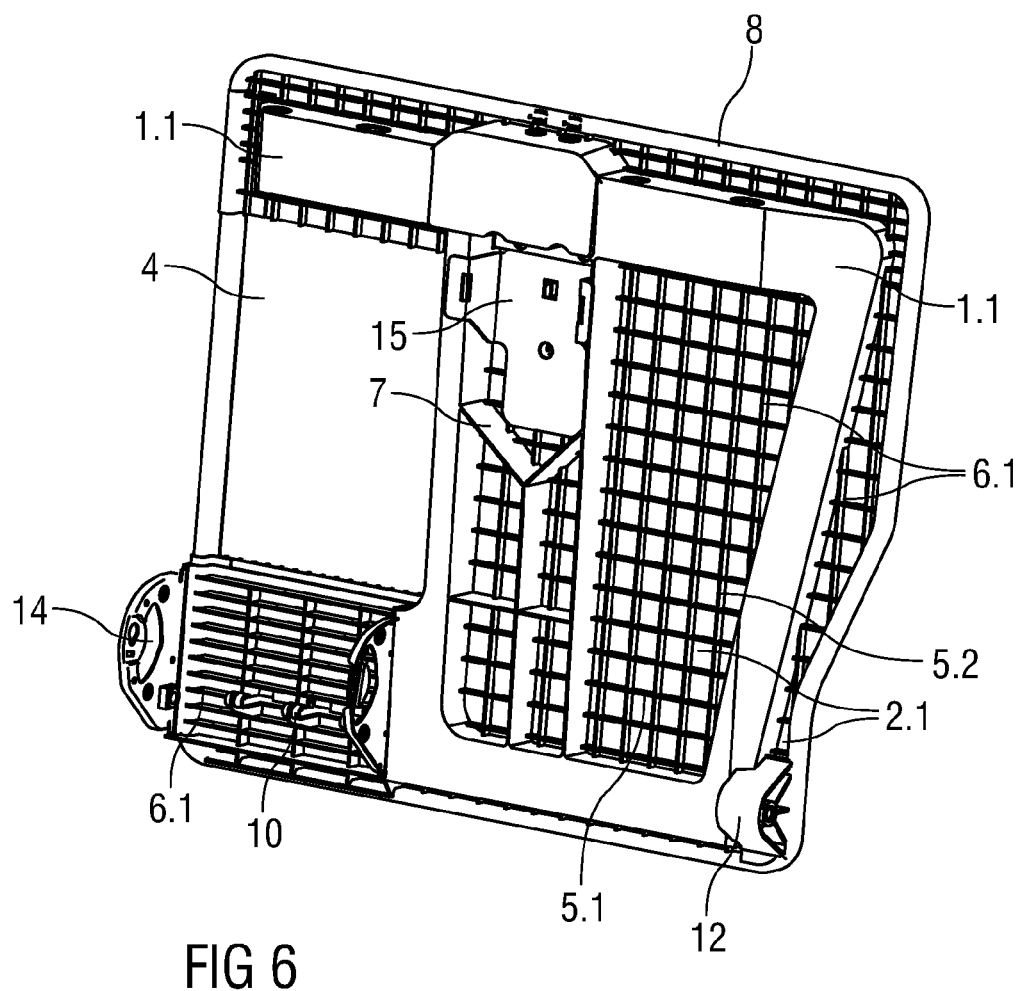
Figure 7:
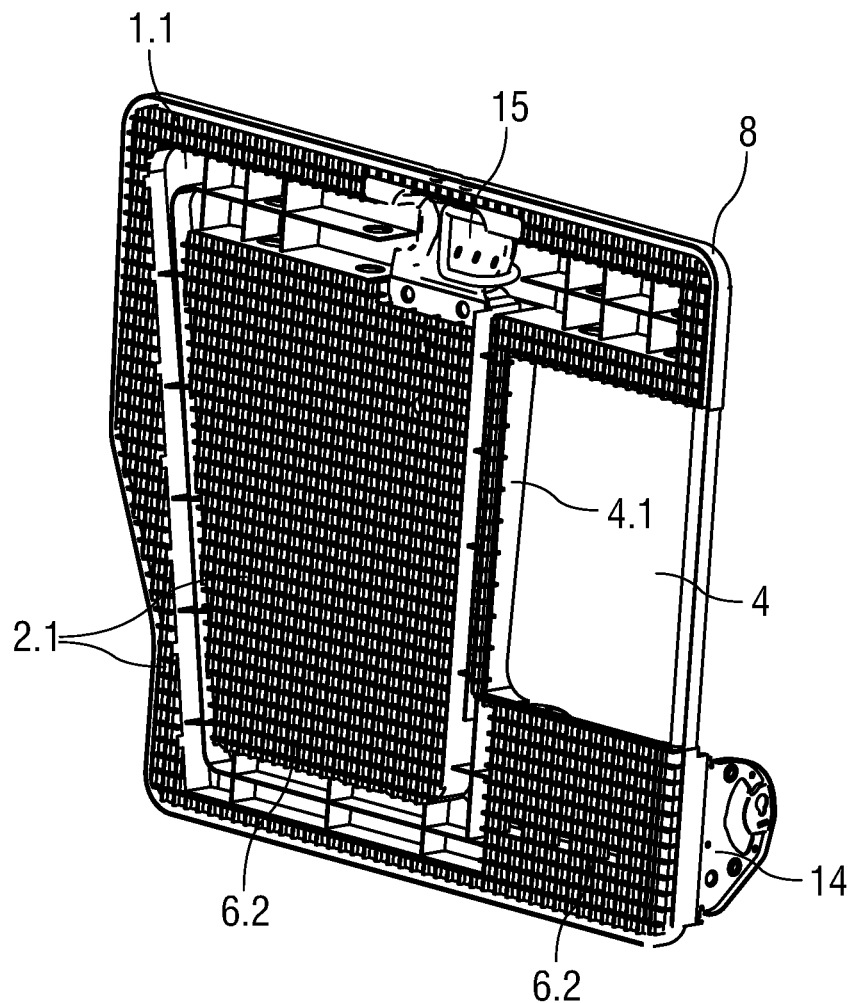

In the figures:

FIG. 1 schematically shows a rather large rest part of a divided seat rest back wall, e.g., in a division ratio of 60% relative to the entire backseat rest, FIG. 2 shows a smaller press part of a divided seat rest back wall, e.g., in a division ratio of 40% relative to the entire backseat rest, FIG. 3 schematically shows an imaginary section along the line A-A in FIG. 2, FIG. 4 schematically shows an imaginary section along the line B-B in FIG. 1, FIG. 5 schematically shows an imaginary section along the line C-C in FIG. 2, FIG. 6 schematically shows the larger rest part in FIG. 1 in a first front perspective view, and FIG. 7 schematically shows the larger rest part in FIG. 1 in a second rear perspective view.

Parts corresponding to each other are provided with the same reference numerals in all figures.

FIGS. 1 and 2 show a rather large and a smaller rest part. Together, these two rest parts form a seat rest back wall that is constructed asymmetrically divided. The division ratio of such a seat rest back wall is, for example, 60% to 40%.

The rest parts shown in FIGS. 1 and 2 consist of a circumferential frame structure 1.1, 1.2 as well of the rack shell 2.1, 2.2 associated with the latter. These components form the supporting framework of the backrest and consist in the example of fiber-reinforced plastic, e.g., glass-fiber-reinforced plastic. Additional reinforcements of material with a greater strength such as, e.g., steel can be used at the spots where an elevated introduction of load is to be reckoned with. The corner connection area 3, that is the basis in the example for the upper connecting of the backrest part to the vehicle body is formed from a profile-like, structural support component 3.1 with a greater strength such as, e.g., steel, on which the plastic frame area 3.2, a partial area of the frame structure 1.2, is supported, that for its part is covered over in a roof-like manner by another profile-like structural cover part 3.3 with a greater strength. With this construction, also called sandwich construction, a high transfer of force can be achieved with a comparatively low use of material. In order to reduce the manufacturing and assembly expense the reinforcements can be directly integrated during the manufacturing process of the plastic structural parts in that they are also directly molded at the same time.

Furthermore, FIG. 1 shows a loading opening 4 such as is customarily used today for stowing long transport material, e.g., skis. The flap that closes the loading opening 4 when not in use is not shown. In the open state of the loading opening 4 the area 4.1 is readily visible in this edge area in FIG. 7. It can also be provided here for aesthetic reasons to provide this area 4.1 with a coating such as, e.g., a textile or a surface structure such as, e.g., a pitting that can also be directly integrated into the manufacturing process in the presented seat structure construction.

It can be seen in FIGS. 1 and 2 as well as 6 and 7 how the back shells 2.1 and 2.2 are reinforced with a plurality of horizontal ribs 5.1 and vertical ribs 5.2. It can furthermore be gathered from FIG. 4 that the ribs are arranged on both sides of the back shell 2.1. For reasons of presentation the back shell 2.2 is shown in the section A-A of FIG. 3 on the backside without ribbing which, however, is nevertheless present in this exemplary embodiment. Likewise, however, another exemplary embodiment of a vehicle seat structure in accordance with the invention would be conceivable that has a non-ribbed front side and/or backside of a back shell 2.1, 2.2. While the reinforcement ribs 6.1 on the front side ensure great rigidity of the back shell, the absorption ribs 6.2 on the backside have the task of reducing elevated energy such as occurs, e.g., in a crash by their intrinsic deformation.

Another special rib shaping is apparent from FIG. 1 and FIG. 6. A V-rip 7, that is, a rib with a V-shaped formation is formed in a one-piece manner on the back shell 2.1 below the area on which the safety belt is mounted on the vehicle seat structure. This shaping also has the task of improving the flow of force since the occurrence of elevated introduction of load into the structure must be reckoned with particularly in this area.

A vertically extending web with trim conduit 8 can be recognized in FIG. 1 and along the imaginary section B-B shown in FIG. 4. The fastening means of the seat covering, also not shown, can be readily attached to this web. The web with trim conduit 8 preferably consists of metal, especially preferably of steel, which has in particular advantages regarding the transfer of force and rendering it shatterproof. The web with trim conduit 8 is connected to a first web connection 9.1, for example, integrally, by molding with the material of the plastic back shell 2.1 in the upper area of the backrest. To this end the area to be molded has perforations through which the plastic melt flows. Due to its flat design, forces are transferred in a laminar manner into bordering areas, which results in a lesser loading of the structural components. The second web connection 9.2 is preferably integrated in the same manner into the plastic back shell 2.1 in the lower area of the backrest.

Another feature of the vehicle seat structure in accordance with the invention is shown in FIGS. 1 and 4 in the lower area. At least one trim hook 10 but preferably at least two more trim hooks 10 are formed in one piece on the front side of the back shell 2.1. The seat cover (not shown) can be attached on these hooks, again with suitable fastening means.

FIG. 3 shows a possibility in the lower area of the vehicle seat structure of how the hat-shaped frame structural part 1.2, that is open on one side, can be closed in a flush, aligned manner relative to the back shell 2.2 with a covering profile 11. To this end the covering profile 11 is, e.g., pressed in or adhered in or connected by other suitable plastic connection methods such as, e.g., ultrasound welding, to the back shell 2.2. Ribbing is arranged on the backside of back shell 2.2 and the covering profile 11 also has such ribbing.

FIG. 5 shows a detail in accordance with an imaginary section line C-C on an enlarged scale that describes a possibility for degrading a load peak caused, e.g., by a crash and thus minimizing the entire load for the vehicle structure. A bush 13 pressed into a rest pivot bearing area 12 of the vehicle seat structure is paired with its outside diameter with the receiving bore of the rest pivot bearing area 12 in such a manner, e.g., with a transitional fit, that the bush 13 can move out of the bearing position in case of an occurring, elevated load in the direction R to an extent that is not critical for safety before it is securely held with suitable structure locking parts (not shown). In this manner at least a part of the loading energy is converted into movement.

Other attached structural parts of metals or non-metals can be integrated into the vehicle seat structure or into parts of it by the previously described, direct molding, as can be seen in the example of the armrest receptacle 14, or they are connected by connection means 16 such as, for example, screws to the vehicle seat structure. This method of construction is represented using the belt connection structural component 15.

LIST OF REFERENCE NUMERALS 1.1, 1.2 frame structure
2.1, 2.2 back shell
3 corner connection area
3.1 structural support component
3.2 plastic frame area
3.3 structural cover part
4 loading opening
4.1 area
5.1 horizontal ribs
5.2 vertical ribs
6.1 reinforcement ribs
6.2 absorption ribs
7 V-rib
8 web with trim conduit
9.1 first web connection
9.2 second web connection
10 trim hook
11 cover profile
12 rest pivot bearing area
13 bush
14 armrest receptacle
15 belt connection structural component
16 connection means
R direction

The invention claimed is:

1. A method of manufacturing at least one of a vehicle seat structure, a vehicle seat and a vehicle seat bench, comprising:
forming at least one back shell extending in a direction transverse to a direction of travel and having a front side relative to the direction of travel and a back side relative to the direction of travel, a frame structure shell, reinforcement ribs arranged on the front side of the back shell, absorption ribs arranged on the back side of the back shell, and structural insertion components arranged on the back shell and/or the frame structure,
wherein said forming includes connecting at least the back shell and the frame structure to each other in a plastic to plastic manner by melting surfaces of the back shell and the frame structure and subsequently joining the back shell and the frame structure at those melted surfaces to form a one-piece integrated structural component,
wherein the back shell comprises an inner portion and an outer portion,
wherein the back shell and the frame structure are molded such that the frame structure surrounds and encloses the inner portion of the back shell in the direction transverse to the direction of travel and separates the inner portion of the back shell from the outer portion of the back shell,
wherein the back shell and/or the frame structure include thermoplastic, and said forming includes encasing at least areas of the structural insertion components in the thermoplastic of the back shell and/or the frame structure, and
wherein the reinforcement ribs and the absorption ribs each include a plurality of horizontal ribs and vertical ribs,
wherein the reinforcement ribs and the absorption ribs surround the structural insertion components on the front side and back side, respectively, of the back shell in the direction transverse to the direction of travel,
wherein the reinforcement ribs are arranged on the inner portion and the outer portion of the front side of the back shell,
wherein the absorption ribs are arranged on the inner portion and the outer portion of the back side of the back shell.

2. The method according to claim 1, wherein the back shell and the frame structure are formed from the same thermoplastic, and the thermoplastic is fiber-reinforced.

3. The method according to claim 1, wherein the frame structure extends across the front side of the back shell in the direction transverse to the direction of travel.

4. The method according to claim 1, wherein the structural insertion components are manufactured from a metallic material or from a semi-product consisting of a fiber composite.

5. The method according to claim 1, wherein said forming includes creating a loading opening in the back shell.

6. The method according to claim 1, wherein the structural insertion components are formed as a structural support component and, in a corresponding manner, as a formed structural covering component and integrated into the frame structure.

7. The method according to claim 1, wherein the structural insertion components are formed as a belt connection structural component.

8. The method according to claim 1, wherein the structural insertion components are formed as a trim conduit.

9. The method according to claim 1, wherein the structural insertion components are formed as armrest receivers.

10. The method according to claim 1, wherein the structural insertion components are formed as rest pivot bearing areas.

11. The method according to claim 1, wherein at least one trim hook is formed on a front side of the back shell.

12. The method according to claim 1, wherein at least one bush is pressed into the vehicle seat structure.

13. The method according to claim 1, wherein other structural components are arranged on the vehicle seat structure by a connector.

14. The method according to claim 1, wherein the reinforcement ribs abut the frame structure on the front side of the back shell.

15. The method according to claim 1, wherein the frame structure extends circumferentially around the inner portion of the back shell.

16. The method according to claim 1, wherein the back shell is configured for use within at least one of a vehicle seat structure, a vehicle seat and a vehicle seat bench.

* * * * *